(12) United States Patent
Nichols

(10) Patent No.: US 8,800,659 B2
(45) Date of Patent: Aug. 12, 2014

(54) EQUIPMENT FOR QUICK DISPERSION OF POLYACRYLAMIDE POWDER FOR FRACTURING OPERATIONS

(75) Inventor: Peter Nichols, Savannah, GA (US)

(73) Assignee: S.P.C.M. SA (FR)

( * ) Notice: Subject to any disclaimer, the term of this patent is extended or adjusted under 35 U.S.C. 154(b) by 167 days.

(21) Appl. No.: 13/446,846

(22) Filed: Apr. 13, 2012

(65) Prior Publication Data

US 2012/0199356 A1    Aug. 9, 2012

Related U.S. Application Data

(63) Continuation of application No. PCT/EP2009/063961, filed on Oct. 23, 2009.

(30) Foreign Application Priority Data

Oct. 19, 2009  (FR) ...................................... 09 57308

(51) Int. Cl.
| | |
|---|---|
| *E21B 43/26* | (2006.01) |
| *C09K 8/62* | (2006.01) |
| *E21B 21/06* | (2006.01) |
| *B01F 15/02* | (2006.01) |
| *B01F 7/16* | (2006.01) |
| *C08J 3/05* | (2006.01) |
| *B01F 3/12* | (2006.01) |
| *C09K 8/68* | (2006.01) |

(52) U.S. Cl.
CPC ........... *E21B 21/062* (2013.01); *B01F 15/0251* (2013.01); *B01F 7/164* (2013.01); *E21B 43/26* (2013.01); *C08J 2333/26* (2013.01); *C08J 3/05* (2013.01); *B01F 3/1221* (2013.01); *E21B 21/06* (2013.01); *C09K 8/685* (2013.01)
USPC ................... 166/308.2; 166/75.11; 166/177.5

(58) Field of Classification Search
None
See application file for complete search history.

(56) References Cited

U.S. PATENT DOCUMENTS

| | | |
|---|---|---|
| 2004/0136262 A1 | 7/2004 | Wilson |
| 2004/0218463 A1 | 11/2004 | Allen |
| 2004/0256106 A1 | 12/2004 | Phillippi et al. |
| 2006/0176771 A1 | 8/2006 | Adams |
| 2010/0246318 A1* | 9/2010 | Kholy et al. ............... 366/152.1 |

FOREIGN PATENT DOCUMENTS

| | | |
|---|---|---|
| EP | 0238723 A2 | 9/1987 |
| EP | 0665050 A1 | 8/1995 |
| EP | 1743913 A1 | 1/2007 |
| WO | 2004007894 A2 | 1/2004 |
| WO | 2008107492 A1 | 9/2008 |

OTHER PUBLICATIONS

International Search Report; Application No. PCT/EP2009/063961; Issued: Mar. 10, 2010; Mailing Date: May 10, 2010; 4 pages.

* cited by examiner

*Primary Examiner* — Zakiya W Bates
(74) *Attorney, Agent, or Firm* — St. Onge Steward Johnston & Reens LLC

(57) ABSTRACT

A compact and transportable installation, which is designed to be used in fracturing operations on gas or oil fields, is provided. The installation successively includes a polymer storage area, a vertical polymer transfer hopper, a supply overflow pipe, a polymer dosing system fed by the pipe, a polymer slicing unit (PSU) type polymer dispersion device, a tank for storage and degassing of polymer in solution, and a volumetric pump to inject and dose the solution of polymer obtained at a suction of a high pressure pump enabling the fracturing operations.

12 Claims, 2 Drawing Sheets

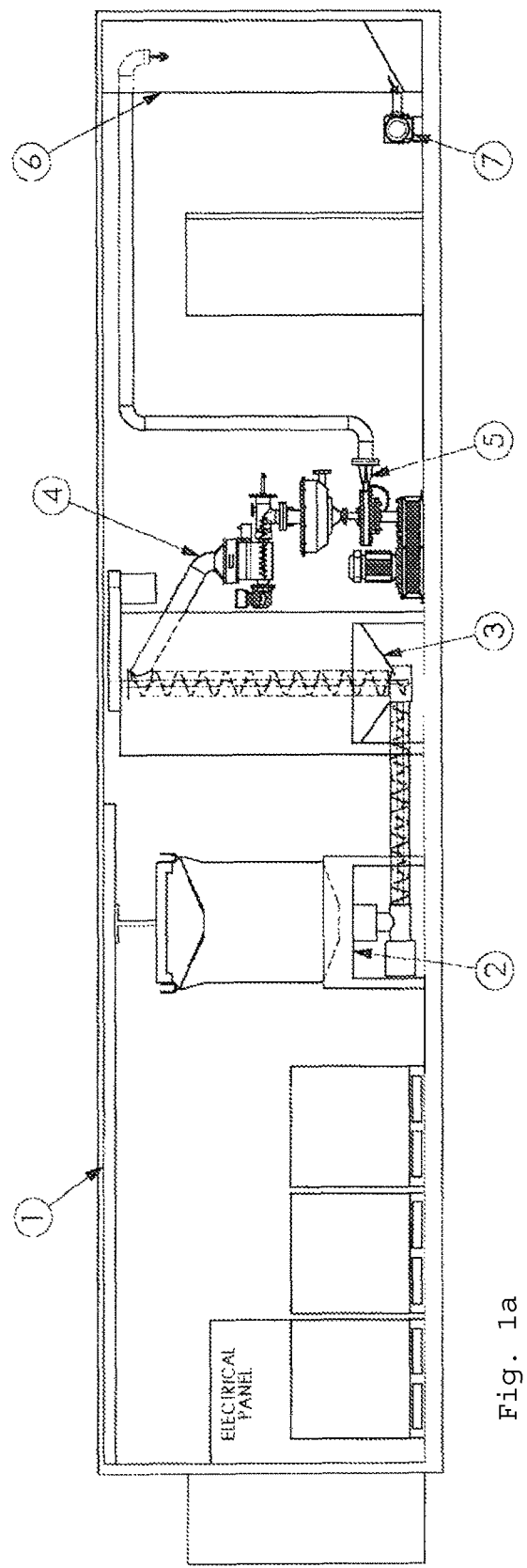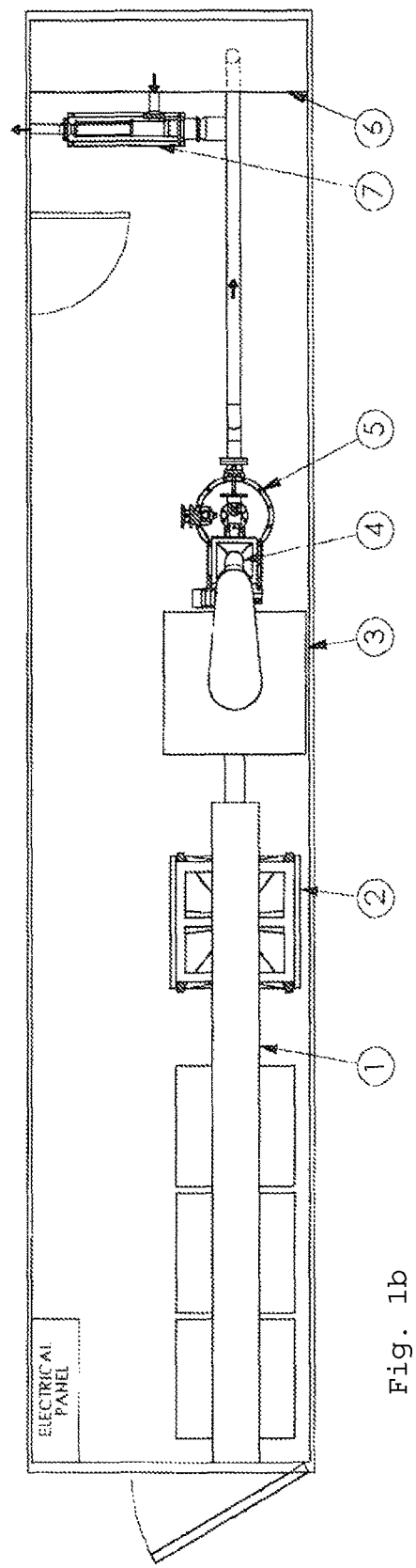
Fig. 1a
Fig. 1b

EQUIPMENT FOR QUICK DISPERSION OF POLYACRYLAMIDE POWDER FOR FRACTURING OPERATIONS

CROSS-REFERENCE TO RELATED APPLICATIONS

The present application is a continuation of pending International Patent Application PCT/EP2009/063961, filed Oct. 23, 2009, which designates the United States and claims priority from French Patent Application 0957308, filed Oct. 19, 2009, the content of which is incorporated herein by reference.

FIELD OF THE INVENTION

Gas production from clayey shale reservoirs (schist) which has been a growing method for several years requires fracturing of the reservoirs to ensure cost-effective gas production.

BACKGROUND OF THE INVENTION

The reserves in this sector are huge and over extremely large areas formerly not recoverable such as coal streaks, fine sand or schist. In the USA, these unconventional resources increased from 28% in 1998 to 46% of the total natural gas produced in the USA. The main huge basins are known as Barnett Shale, Fayette Ville Shale, Mowry Shale, Marcellus Shale, etc.

The production techniques have often evolved from vertical wells to horizontal wells, reducing the number of production wells. However, in all cases, the permeability is insufficient to naturally produce a quantity of gas making the operations cost-effective.

The permeability and production areas therefore need to be increased by way of stimulation operations and fracturing in particular.

Hydraulic Fracturing

Hydraulic fracturing is designed to create an additional level of permeability and an increased gas production surface areas. Indeed, low permeability, natural barriers of compact layers, impermeability due to drilling operations greatly limit production.

These fracturing operations started in 1960 in the Appalachian Mountains and today over one million operations have taken place in the USA.

Engineering, design and implementation technologies have become increasingly sophisticated and require equipment enabling to perform these operations in shorter times with detailed analysis of the results.

Specific simulators are capable of forecasting very accurate results.

Fracturing Operation

These operations involve injecting high pressure water at a very high flow rate to create fractures within the production wells.

When the fractures are open, sand or beads of a particular size are injected to prevent these fractures from closing and to maintain the production surface areas thus created.

The injection water usually contains a significant amount of additives, each with a defined function. Generally speaking, the injected composition includes:

clay swelling inhibitors such as potassium chloride
biocides to prevent bacteria, particularly sulphate-reducing bacteria, from developing and capable of forming viscous masses reducing the injection areas. Aldehydes are the most commonly used biocides as glutaraldehyde, acrolein, etc. . . .
oxygen scavengers such as ammonium bisulphite to prevent the destruction of other components due to oxidation and corrosion of the injection lines,
corrosion inhibitors to protect the lines from oxidation by residual quantities of oxygen. Preference is given to N, n dimethylformamide,
lubricants such as petroleum distillates,
gelling agents such as guar gum and hydroxyethyl cellulose,
iron-chelating agents such as citric acid, EDTA, phosphonates,
scale control products such as phosphates, phosphonates or ethylene glycol,
friction reducers to reduce the pressure drop in turbulent media and significantly increase the flow rate for the same power and pipe diameter.

Acid treatment is often performed before or during injection to treat cementation residue or to dissolve part of the rock in place in order to provide better access to the field. The sand injected is of a particular size, usually between 40 and 100 mesh.

Friction Reducer

The drag reduction (friction reduction) phenomenon in turbulent flow was discovered by B. A Toms in 1946 ("Toms effect") even though previous descriptions ascertained that certain additives seemed to enhance high speed flows.

These products are therefore used to reduce pressure drop in line.

When the medium is made up of hydrocarbons, oil-soluble polymers are used, particularly polymethyl methacrylate or carbohydrate polymers.

When the medium is water, very high molecular weight polymers such as polyacrylamides and ethylene oxide polymers are used. Preference is generally given to polyacrylamides for cost and sourcing reasons.

Polyacrylamides

Initially developed for flocculation applications (water treatment, mineral treatment, paper mills, etc), polyacrylamides are increasingly used in other applications, and especially where their thickening effect on water based system is desired.

This development is of particular interest for Enhanced Oil Recovery, Cosmetics and Thickeners for textile printing, etc.

In the description hereinafter and the subsequent claims, the generic term of polyacrylamides covers acrylamide homopolymers as well as all the copolymers containing both acrylamide and other monomers such as:

acids such as (metha)acrylic acid, AMPS (2-Acrylamido-2-methylpropane sulfonic acid), etc
cationic monomers such as the ammonium salts of trimethylethyl methacrylate, diallyl dimethyl ammonium chloride, etc These polymers can be modified by:

branching with branching agents in sufficiently low quantities to maintain the solubility
Hydrophobic monomers giving associative polymers
Monomers with both anionic and cationic charges (zwitteronic monomers)
Associations of anionic and cationic monomers (amphoteric), etc
Monomers giving comb polymers.

The Person skilled in the art is well aware of these sets of products described in numerous patents.

For friction reduction, the polymers used must have the highest molecular weight possible while keeping very good solubility.

The polymer of choice is an acrylamide sodium acrylate copolymer (70% 30% molar ratio) with a molecular weight close to 20 million.

For their ease of handling, reverse emulsions (W/O) of these polymers are used with a concentration of active matter between 20 and 50%. These emulsions are stable in storage for about 6 months and dissolve very quickly (few minutes) in water under stirring.

They allow an in line injection in the fracturing water before the high pressure pump and are practically fully dissolved in a few minutes both immediately and in the injection line.

The quantities of polymers injected can be between 250 and 2,000 ppm of active matter and the fracturing time between 2 and 15 hours with several stages of injections (2 to 20).

The use of emulsions is today generalised over the entire territory of USA-Canada-Mexico and is spreading into other countries according to new reserves to be exploited.

Powder Polyacrylamides

Environmental pressure has become increasingly strong both in terms of the water used for this operation and the water produced.

The constant demand is to only consume the water from the field and to treat the water produced which is made up of 60 to 80% of the water injected.

The use of powder polymers avoid injecting both hydrocarbons and surface active agents to be treated in the water produced.

SUMMARY OF THE INVENTION

The problem to be solved is then how to dissolve substantial quantities of polymers in short periods of time, i.e. 0.5 to 5 tonnes of polymers in 4 to 10 hours with quick start up (10 to 30 minutes).

Using standard dispersion equipment with dispersion with an ejector, a wetting shovel or a spray of water around a pneumatic transport system, the concentration of mother solution reach a maximum of 5 g/liter. Furthermore, it is not possible to design operations requiring for discontinuous dispersions which would involve volumes of several hundreds of $m^3$ to be stored with operation times of 3 to 4 hours.

It was therefore necessary to find way allowing very quick in line dispersion of substantial quantities of polymer at a very high concentration while reducing as much as possible the size of the equipment which must be transportable, i.e. small enough to fit on the platform of a truck.

To do this, the Applicant has engineered a compact and transportable installation, quick to start up and independent, allowing to dissolve at high concentration, in very short periods of time, substantial quantities of polyacrylamide powder and designed to be used in fracturing operations on gas or oil fields whereby the installation successively includes:

a polymer storage area
a vertical polymer transfer hopper
a supply overflow pipe feeding
a polymer dosing system fed by the above pipe
a polymer dispersion device including:
    a polymer wetting cone connected to a primary water inlet circuit
    at the lower end of the cone:
        a dispersed polymer slicing and discharge chamber including:
        a rotor driven by a motor and equipped with blades
        a fixed stator made up of evenly spaced plates
    over all or part of the periphery of the chamber, is a ring supplied by a secondary water circuit, the ring communicating with the chamber so as to ensure the spray of pressurised water over the plates of the stator thereby allowing for the release of the sliced and swollen polymer at the surface of the said plates
a tank for storage and degassing of the polymer in solution
a volumetric pump to inject and dose the solution of polymer obtained at the suction of the high pressure pump enabling the fracturing work.

Such an installation is sufficiently compact to fit in a container, on the platform of a truck.

Obviously, the quantity of polymer to be dissolved would vary according to the capacity of the well to be fractured. The bags of powder are stored at the rear of the platform. In practice, this relates to bags of 25 kg for low capacities or 750 kg for higher capacities.

When the powder is stored in bags of 750 kg, the installation is, in this case, equipped with a bag hoisting system and a hopper and an additional horizontal transfer screw, preceding the vertical hopper and into which the contents of the bags is poured.

According to the invention, the dosing system is a screw feeder allowing a flow rate in practice of 100 or 300 kg/h according to the equipment used.

In order to convey the polymer from the hopper into the doser, the installation is equipped with an overflow pipe of a diameter of 100 to 200 mm according to the equipment used.

A dispersion device similar to the one used in the invention has been described by the Applicant in document WO 2008/107492 incorporated by reference, for Enhanced Oil Recovery (EOR) or flocculation applications.

The Applicant observed that through few modifications, along with the above-mentioned information, this device called PSU (Polymer Slicing Unit) could be adapted to fracturing.

It is therefore practically possible to use powder polyacrylamides of different particle sizes for fracturing operations.

The polyacrylamide has a molecular weight of at least 10 million, preferably more than 15 million.

The specifications of the PSUs which can be used for this invention are summarized in the following table:

TABLE 1

| Specifications of the slicing unit | PSU 100 | PSU 300 |
|---|---|---|
| Cutting diameter in mm (size of rotor) | 100 | 200 |
| Number of fixed blades | 50 | 90 |
| Height of fixed blades in mm | 16.6 | 16.6 |
| Maximum spacing between blades | 700 microns | 700 microns |
| Spacing between fixed/rotating blades | 100 microns | 100 microns |
| Cutting angle | 2° | 3° |
| Number of rotating blades (i.e.: on the rotor) | 4 | 6 |
| Rotor speed | 5,000 rpm | 3,000 rpm |
| Motor power rating | 3 kW | 7.5 kW |
| Dispersion specifications | | |
| Maximum primary water flow rate | 3 $m^3$/h at 25° C. | 10 $m^3$/h at 25° C. |
| Maximum flow rate of anionic polyacrylamide (anionicity: 30%; molecular weight: 19 millions; particle size: 0-1000 microns) | 100 kg/h | 300 kg/h |

TABLE 1-continued

| Specifications of the slicing unit | PSU 100 | PSU 300 |
|---|---|---|
| Maximum secondary water flow rate in the concentric ring surrounding the stator (pressure: 4 bars) | 8 m³/h at 25° C. | 20 m³/h at 25° C. |
| Final concentration of powder dispersion in water greater than | 10 g/l | 10 g/l |
| Final pressure | 1 bar | 1.5 bar |
| dispersion time to obtain the maximum usual viscosity at 40° C. | <10 min | <10 min |

The polymer in suspension obtained at the outlet of the dispersion device (PSU) is then stored in a vertical tank, also used for degassing, and with an effective volume of between 1 and 5 m³ according to the volume to be injected. The tank is in general fitted with a low level gauge and a high level gauge to prevent unwanted tripping or stopping of the PSU according to the demand.

The storage time of the polymer suspension in the tank is between 10 and 20 minutes, advantageously approximately 15 minutes.

The invention also relates to a hydraulic gas or oil well fracturing process by injection of fracturing made of fracturing water/polyacrylamide in solution, implementing the installation described above and providing a significant drag reduction effect.

The injection of the fracturing water/polymer mix in solution into the rock is performed at pressure between 50 and 600 bars, advantageously approximately 400 bars.

The invention shall be made apparent from the following examples of embodiments supported by the appended figures.

BRIEF DESCRIPTION OF THE DRAWINGS

FIGS. 1a and 1b are a schematic representation of the dispersion installation of the invention according to the embodiment described above for bags of 750 kg with a PSU 300.

DETAILED DESCRIPTION OF THE INVENTION

Example 1

Figure 2A:
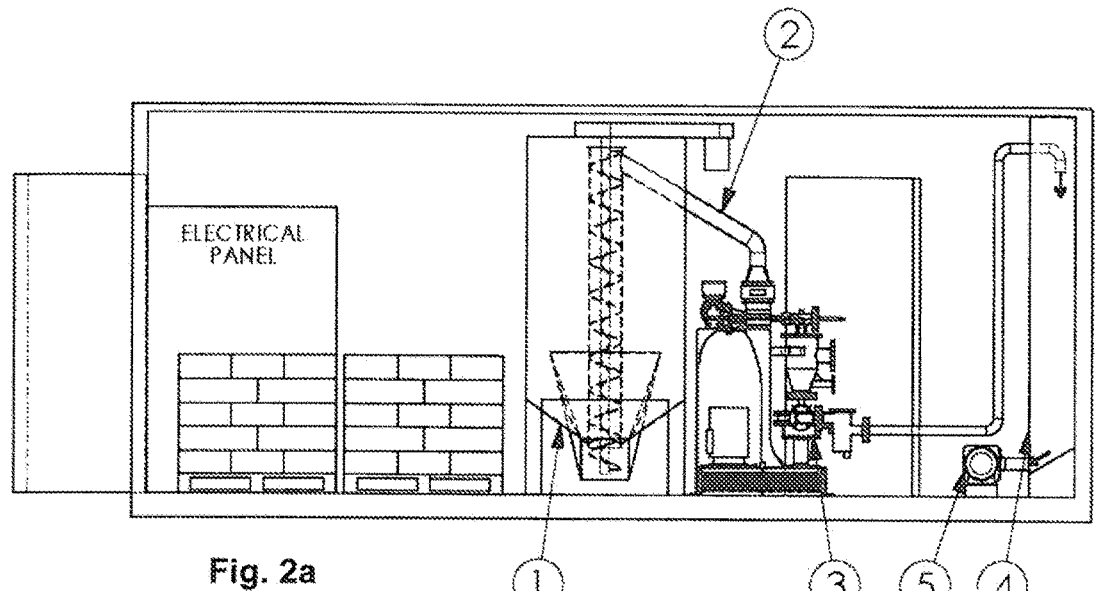
FIGS. 2a and 2b are a schematic representation of the dispersion installation of the invention according to the embodiment described above for bags of 25 kg with a PSU 100.
Figure 2B:
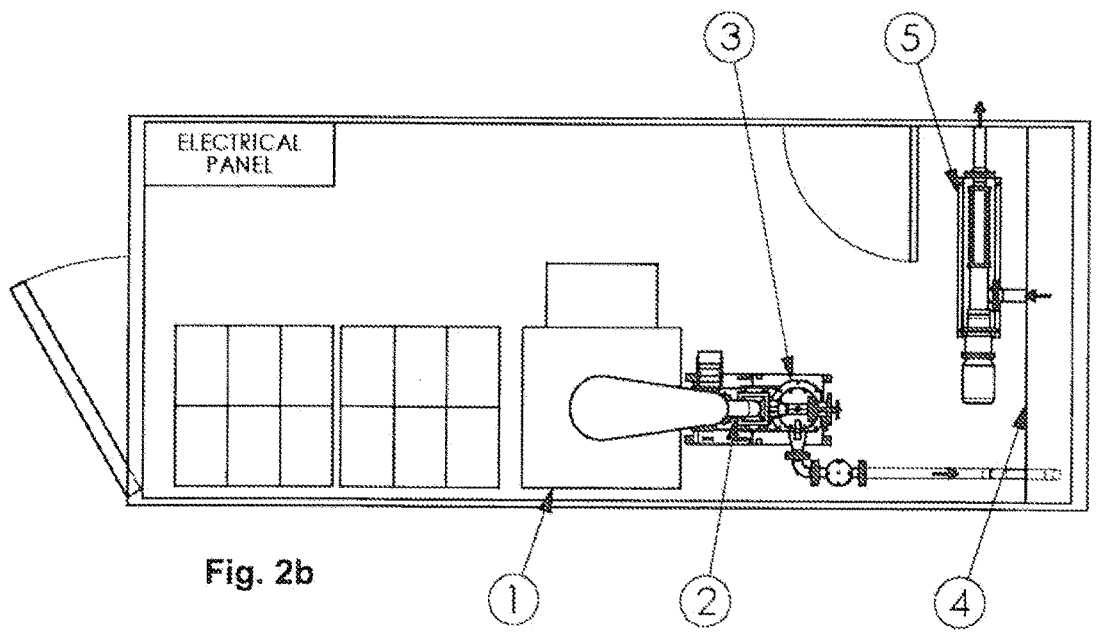

A fracturing operation is to be performed in the following conditions:
instant flow rate: 15 m³/min, (900 m³/h)
diameter of pipe: 6 inches
injection speed: 13.7 m/sec,
number of successive injections: 5
polymer concentration: 300 ppm,
total fracturing time: 13 hours.

270 Kg/hour of polyacrylamide must therefore be injected over a total time excluding stops between phases of approximately 10 hours i.e. approximately 3 tonnes of powder.

The equipment must be as compact as possible to fit on the platform of a truck of 12 m×2 m30 H=3 m.

The construction chosen is made up according to FIGS. 1a and 1b of:
a rail with (1) with a hoist to unload big bags of 750 kg (4 big bags for one operation)
a hopper (2) under the big bag with a horizontal screw, Ø150, pitch 150 mm, at a speed of 100 rpm
a vertical hopper (3) with a screw Ø200, pitch 200 mm, speed: 80 rpm to bring the powder fed by the previous screw into the hopper
an overflow pipe of Ø150 (4) supplying a screw feeder with a flow rate of 300 kg/h
a PSU 300 (5) as described in document WO 2008/107492, supplied at the top point at a flow rate of 5 m³/h and at the lower point at 10 m³/h. In order to increase the dispersion speed, the space between the cutting blades is reduced to 500 microns and the rotor speed is increased to 4,500 rpm
the suspension obtained in the dispersion device is sent into a vertical tank (6) used for degassing giving a holding time of 15 minutes, i.e. effective volume of 4 m³ and total volume of 5 m³ equipped with a high level gauge and a low level gauge stopping and starting the dispersion device according to the product demand. This storage time allows for the installation to be started up in less than 20 minutes
a Moineau pump (7) with a flow rate of 15 m³/h equipped with a variable speed control allowing for variation of this flow rate and controlled by the central control department which determines the quantity used according to the head loss found
this Moineau pump is connected to the suction of the main injection pump of the fracturing system.

By varying the flow rate of the volumetric pump injecting the polymer solution, one finds that the same result on the improvement of the injection of pressure is obtained as with an emulsion.

That is, in this case, with a field pressure of 110 bars, the total injection pressure is of 265 bars in both cases. Without the polymer the pressure would be approximately 420 bars.

Example 2

For small capacity operations, a PSU 100 type dispersion device can be used allowing for a flow rate of a solution at 20 g/liter of 5 m³/h and a powder flow rate of 100 Kg/h.

For operations over 10 hours, the quantity of polymer to be stored will be 1,000 kg, brought in bags of 25 kg.

The installation would include:
a mixer hopper (1) with central vertical screw of 2 m³. The bags are emptied into a cone at the base of the hopper and the product is introduced into the hopper by the vertical screw
an overflow pipe (2) of Ø100 supplying a screw feeder at a maximum flow rate of 100 kg/h
a PSU 100 (3) to put 100 kg of polymer per hour into suspension in a volume of water of 5 m³ giving a concentration of 20 g/liter. This dispersion device is equipped with cutting blades spaced 500 microns apart, at a speed of 4,500 rpm
A degassing tank with effective volume of 1.25 m³ (4) with a holding time of 15 minutes providing start up in a very short time of less than 15 minutes. This tank is equipped with a low and high level gauge to start up or stop the dispersion device according to the demand
a Moineau pump (5) with a flow rate of 5 m³/h with variable speed control enabling injection of the solution at the suction of the Triplex fracturing pump.

The injection is performed via a 4-inch pipe with a flow rate of 200 m³/h and a concentration of 500 ppm.

Two wells are treated on the same site: one with an emulsion of 70-30 acrylamide/acrylic acid molar mass, of molecular weight of 18 million, at a concentration of 30% active matter, the other with a powder of the same specifications but with a 10% moisture content.

The pressure at the well bottom is 95 bars. With 500 ppm of active matter, it is observed that the injection pressures to obtain a flow rate of 200 m$^2$/h are 190 bars for the emulsion and 185 bars for the powder.

What is claimed is:

1. A compact and transportable installation, which is quick to start up and is independent, which allows for dissolution of at high concentration, in very short periods of time, substantial quantities of polyacrylamide powder and which is designed to be used in fracturing operations on gas or oil fields, said installation successively including:
   a polymer storage area;
   a vertical polymer transfer hopper;
   a supply overflow pipe;
   a polymer dosing system fed by said pipe;
   a polymer slicing unit (PSU) type polymer dispersion device, the polymer dispersion device comprising:
      a polymer wetting cone connected to a primary water inlet circuit at a lower end of the cone,
      a dispersed polymer slicing and discharge chamber including a rotor driven by a motor and equipped with blades and a fixed stator made up of evenly spaced plates, and
      wherein over all or part of a periphery of the chamber a ring is supplied by a secondary water circuit, the ring communicating with the chamber so as to ensure spray of pressurized water over the plates of the stator thereby allowing for release of sliced and swollen polymer at a surface of the said plates;
   a tank for storage and degassing of polymer in solution; and
   a volumetric pump to inject and dose the solution of polymer obtained at a suction of a high pressure pump enabling the fracturing operations.

2. An installation according to claim 1 wherein the polymer dispersion device is a screw batcher with a flow rate of 100 kg/h.

3. An installation according to claim 1 wherein the polymer dispersion device is a screw batcher with a flow rate of 300 kg/h.

4. A hydraulic gas or oil well fracturing process comprising the step of injecting a mixture of fracturing water/polyacrylamide in solution, implementing the installation of claim 1.

5. The process according to claim 4 wherein the polyacrylamide has a molecular weight of at least 10 million.

6. The process according to claim 4 wherein the polymer dispersion is done at a concentration of at least 10 g/l, in less than 10 minutes with a polyacrylamide flow rate of 100 kg/h.

7. The process according to claim 4 wherein the polymer dispersion is done at a concentration of at least 10 g/l, in less than 10 minutes with a polyacrylamide flow rate of 300 kg/h.

8. The process according to claim 4 wherein a storage time of the polymer is between 10 and 20 minutes.

9. The process according to claim 4 wherein the injection of the fracturing water/polyacrylamide in solution mix is performed at a pressure between 50 and 600 bars.

10. The process according to claim 5 wherein the polyacrylamide has a molecular weight of at least 15 million.

11. The process according to claim 8 wherein the storage time of the polymer is approximately 15 minutes.

12. The process according to claim 9 wherein injection of the fracturing water/polyacrylamide in solution mix is performed at a pressure of about 400 bars.

* * * * *